UNITED STATES PATENT OFFICE.

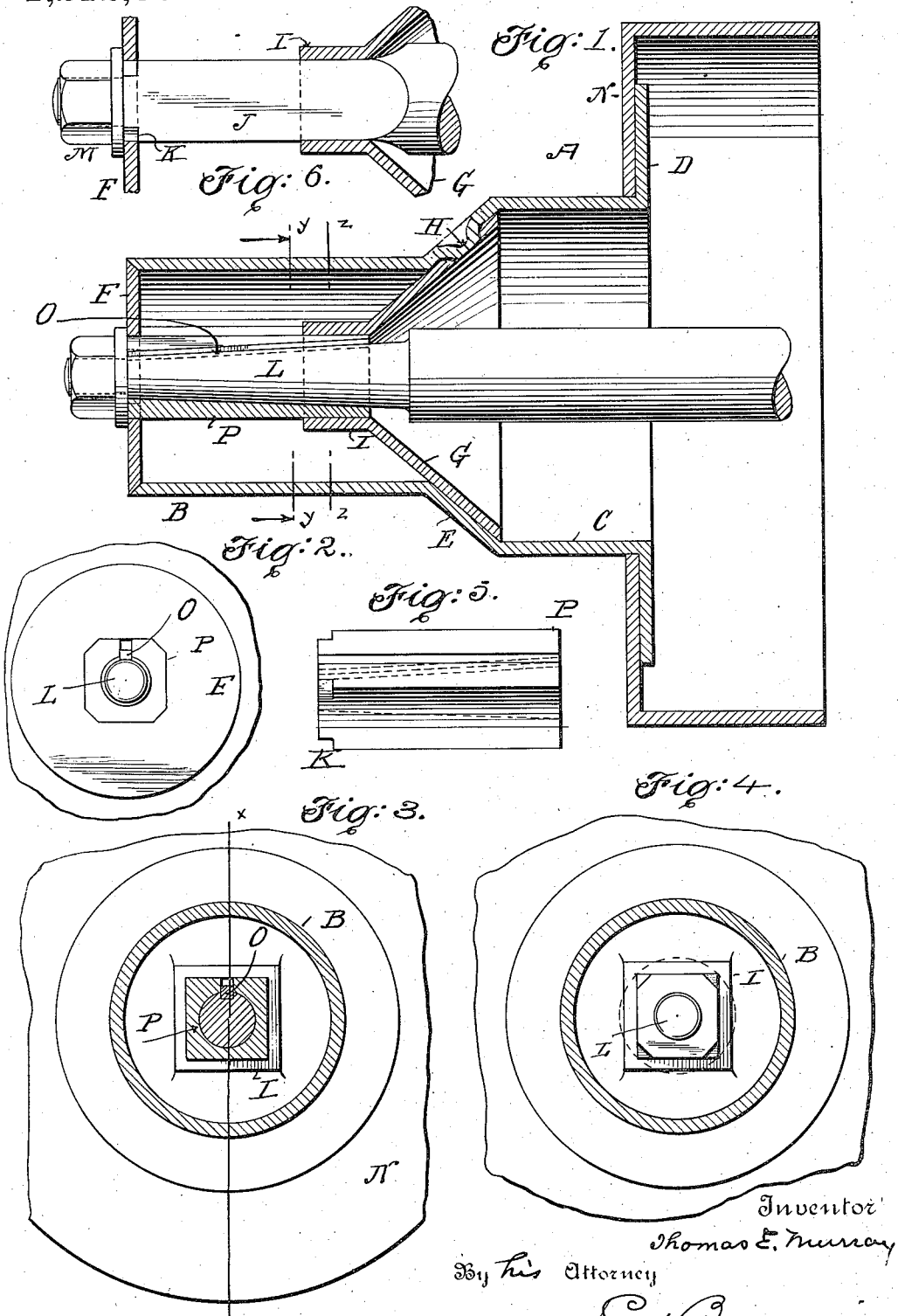

THOMAS E. MURRAY, OF NEW YORK, N. Y.

METAL HUB FOR VEHICLE-WHEELS.

1,212,802.  Specification of Letters Patent.  Patented Jan. 16, 1917.

Application filed April 1, 1916. Serial No. 88,225.

*To all whom it may concern:*

Be it known that I, THOMAS E. MURRAY, a citizen of the United States, residing at New York, in the county of New York and State of New York, have invented a certain new and useful Improvement in Metal Hubs for Vehicle-Wheels, of which the following is a specification.

The invention relates to metal hubs for vehicle wheels, and consists in the construction whereby the hub is adapted for application to either a circular or polygonal driving axle, and is easily removable.

In the accompanying drawings Figure 1 is a section of my hub on the line $x$, $x$ of Fig. 3. Fig. 2 is a front elevation, the fastening nut and washer being removed. Fig. 3 is a section on the line $z$, $z$ of Fig. 1. Fig. 4 is a section on the line $y$, $y$ of Fig. 1. Fig. 5 shows the adapting sleeve P separately. Fig. 6 shows the collar and front wall of the hub, and a quadrangular axle shaft therein. In Fig. 1 the adapting sleeve of Fig. 5 is in place on a tapered circular shaft.

Similar letters of reference indicate like parts.

A generally designates a steel hub having an outer cylindrical portion B, and an inner cylindrical portion C, of greater diameter than portion B, provided with a circumferential flange D, and a tapered portion E between said portions B and C. In the front wall F of the hub is a polygonal central opening.

G is a frusto-conical collar which is seated in the tapered portion E of the hub, and connected thereto by welding. Also, if desired, the metal of said portion E may be struck up at one or more points to form inward projections H which enter corresponding openings in said collar. At the smaller end of the collar is a tubular polygonal portion I, here of quadrangular cross section, in line with the polygonal opening in the front hub wall.

As shown in Fig. 6, J is a driving axle shaft of quadrangular cross section to fit in the tubular portion I of collar G. At the corners of the outer end of said shaft are formed shoulders K which bear upon the inner side of the front wall F. Said shaft conforms in cross section to the polygonal opening in wall F, and fits in said opening. Beyond said opening the shaft is cylindrical and threaded to receive the usual nut and washer M.

When it is desired to substitute a tapered shaft L, provided with a key O, in place of the quadrangular shaft J, I provide an adapting sleeve P, Fig. 5, of quadrangular cross section which fits in the tubular portion I of collar G, and at its end is shouldered in similar manner to shaft J, to bear upon the inner side of front wall F, the extremity being of suitable polygonal shape to fit in the opening in said front wall. Said adapting sleeve is internally tapered to receive the tapered shaft L, and is longitudinally slotted to receive the key O on said shaft. The extremity of shaft L beyond wall F is cylindrical and threaded to receive nut and washer M. The brake pulley N may be placed upon the hub and welded to flange D thereof.

I claim:—

1. A hollow metal hub having a central opening in its front wall, a collar fixed within said hub having a central tubular projection of polygonal cross section, a driving axle shaft fitting in said projection and extending through said wall opening, and means for securing said hub on said axle shaft.

2. A hollow metal hub having a central polygonal opening in its front wall, a collar fixed within said hub having a central tubular projection of polygonal cross section, a driving axle shaft fitting in said projection and said wall opening, and means for securing said hub on said axle shaft.

3. A hollow metal hub having a central polygonal opening in its front wall, a collar fixed within said hub having a central tubular projection of polygonal cross section, a driving axle shaft, a polygonal sleeve secured on said shaft and fitting in said projection and said wall opening, and means for securing said hub on said axle shaft.

4. A hollow metal hub having a central polygonal opening in its front wall, a collar fixed within said hub having a central tubular projection of polygonal cross section, a driving axle shaft, a polygonal sleeve having a longitudinal key-way and fitting in said projection and said wall opening, a key on said axle shaft received in said key-way, and means for securing said hub on said axle shaft.

5. A hollow metal hub having an axle-supporting opening in its outer wall and formed with an inner section, an outer section of less diameter than said inner section and a middle tapering section uniting said outer and inner sections, a tapered collar seated and secured in said middle section, and an axle-receiving sleeve centrally disposed in and carried by said collar.

6. A hollow metal hub having an axle-supporting opening in its outer wall and formed with an inner section, an outer section of less diameter than said inner section and a middle tapering section uniting said outer and inner sections, an inwardly turned projection on said middle section, a tapered collar seated in said middle section and having an opening receiving said projection, and an axle-receiving sleeve centrally disposed in and carried by said collar.

In testimony whereof I have affixed my signature in presence of two witnesses.

THOMAS E. MURRAY.

Witnesses:
GERTRUDE T. PORTER.
MAY T. MCGARRY.